(No Model.)
M. FLAMMANG.
PHOTOGRAPHIC CAMERA.
No. 278,788. Patented June 5, 1883.
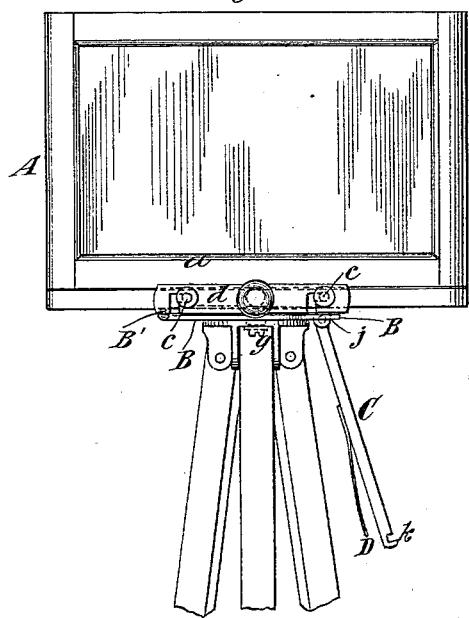
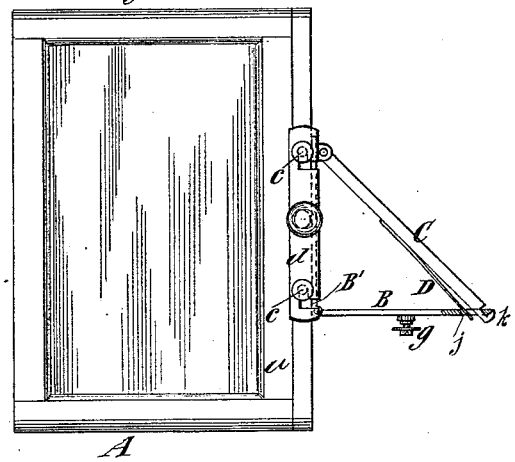
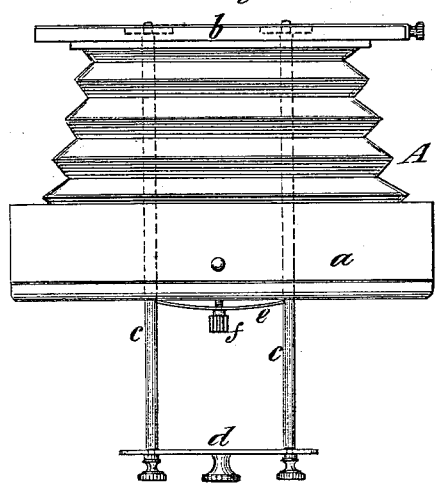
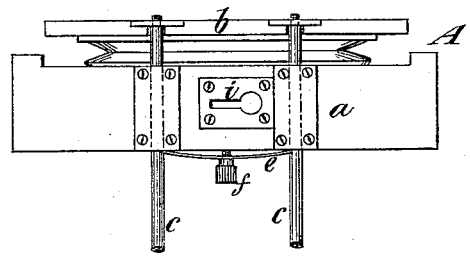
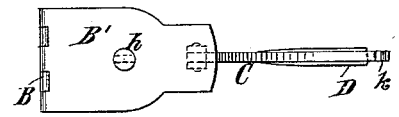
Witnesses
James R. Bowen
Alfred L. Brown
Inventor
Mathias Flammang
by his attorney,
Edwin H. Brown.

UNITED STATES PATENT OFFICE.

MATHIAS FLAMMANG, OF NEWARK, NEW JERSEY.

PHOTOGRAPHIC CAMERA.

SPECIFICATION forming part of Letters Patent No. 278,788, dated June 5, 1883.

Application filed March 26, 1883. (No model.)

*To all whom it may concern:*

Be it known that I, MATHIAS FLAMMING, of Newark, in the county of Essex and State of New Jersey, have invented a certain new and useful Improvement in Photographic Cameras, of which the following is a specification.

The principal object of the present improvement is to provide for readily reversing a camera, so as to take pictures with the length of a photographic plate either in a horizontal or a vertical plane.

In the accompanying drawings, Figure 1 is a back view of a camera adjusted into such position that the length of a photographic plate placed therein will be in a horizontal plane. Fig. 2 is a back view of the camera adjusted into such position that the length of a photographic plate placed therein will be in a vertical plane, certain parts being shown partly in section. Fig. 3 is a plan of the camera adjusted into the same position as it is shown in Fig. 1. Fig. 4 is a view of the bottom of the back frame of the camera, and Fig. 5 is a plan of the base-plate on which the camera is mounted.

Similar letters of reference designate corresponding parts in all the figures.

A designates the camera. It may be of any suitable construction; but, as shown, it is supported by a base-plate, B B', to which its back frame, *a*, is connected, and it has a front frame, *b*, attached to rods *c*, which slide through the back frame. These rods are screwed into the front frame, and may be detached from the camera to facilitate packing it.

To the rear end of the rods is fitted a plate, *d*, forming a hand-piece, whereby both rods may be shifted with one hand. In this plate are L-shaped slots, which may be slipped over grooves in the rods. The plate may therefore be readily attached to and detached from the rods. A plate, *e*, is attached by a screw, *f*, to the camera back, is bowed between the ends, and has the ends concaved to fit the rods *c*. By turning the screw *f* so as to force the middle portion of this plate nearer to the camera-back, the ends of the plate may be caused to press with greater force against the rods. Thus a friction-brake of variable force is produced, and the accidental slipping of the rods in the back frame of the camera may be avoided.

The base-plate will preferably be made of metal, and is composed of two sections, B B', which are hinged together at adjacent ends. The section B has a pivot, *g*, whereby it is connected to a stand in such manner that it may be turned relatively to the stand. The pivot and its connection with the stand may be of any approved kind.

The section B' is provided on the upper or outer side with a metal pin, *h*, which has a head at the outer end and flat sides below or behind the head. The bottom of the back frame of the camera has a cavity covered with a metal plate, *i*, in which is a slot consisting of a circular portion and a straight parallel-sided portion extending therefrom. The circular portion of the slot in the plate *i* is slipped over the head of the pin *h*, and the camera is then shifted laterally to cause the portion of the slot having parallel sides to embrace the flat sides of the said pin. Thus a detachable connection between the base-plate and the camera is afforded.

C designates a rod, which is hinged to the section B' of the base-plate and passes through a slot, *j*, in the section B of the base-plate. At the free end it is provided with a hook, *k*, which, when the sections of the base-plate are swung apart, can engage with the slotted portion of the section B of the base-plate. A spring, D, attached to the rod C and bearing against the slotted portion of the section B of the base-plate, insures the engagement of the hook *k* with the said section when the sections are swung apart. The rod C is hinged to the section B' of the base-plate at a point so far from the said section that when the two sections of the base-plate are swung together it may be swung across the under side of the section B, so as to maintain the two sections in this relation. Owing to this construction of the base-piece the camera may be adjusted into a position which will bring both sections of the base-plate together, and so that the length of a photographic plate placed in the camera will be in a horizontal plane; or by swinging down the rod C the camera may be turned over a quarter-turn, so as to bring the length of the photographic plate in a vertical plane. The rod C will automatically lock the camera in this position; but on disengaging its hook from the section B of the base-plate the camera may be adjusted back to the first position.

It will be obvious that the camera may thus be adjusted with great facility into different positions for taking different-shaped pictures.

The L-shaped slots of the plate $d$ are particularly advantageous with a reversible camera of this kind, as the plate is secured to the rods $c$, so that it will not be liable to be knocked off when the camera is in either of its positions.

The camera may be turned around relatively to its stand when adjusted into either of its positions.

I do not wish to confine myself to the use of the rod C, for I could connect the sections of the base-plate by a stop-hinge, which would admit only of a range of adjustment to bring the camera into either of its two positions; or I could use other devices to secure the same result. The camera could be hinged directly to a stand or other support.

What I claim as my invention, and desire to secure by Letters Patent, is—

1. The combination, with a camera, of a base-plate or support to which it is hinged, so that it can be adjusted into positions which will bring the length of a photographic plate placed therein in a horizontal or a vertical plane, substantially as specified.

2. The combination, with a camera, of a base-plate or support to which it is hinged, so that it can be adjusted into positions which will bring the length of a photographic plate placed therein in a horizontal or a vertical position, and means for holding the camera to the latter position, substantially as specified.

3. The combination, with a camera, of a base-plate hinged to a support, so that the camera can be adjusted into positions which will bring the length of a photographic plate placed therein in a horizontal or a vertical position, and a detachable connection between the camera and the base-plate, substantially as specified.

4. The combination, with a camera, of a base-plate adapted to have a pivotal connection with a stand, the camera being so hinged to the base-plate that it may be adjusted into positions to bring a photographic plate placed in the camera with the length in a horizontal or a vertical position, substantially as specified.

5. The combination, with a camera, of a base-plate composed of sections B B', and the rod C, hinged to the section B' and adapted to engage with the section B, substantially as specified.

6. The combination, with a camera, of a base-plate composed of sections B B', the rod C, hinged to the section B' and adapted to engage with the section B, and the spring D, substantially as specified.

7. The combination, with a camera, of a base-plate composed of sections B B', and the rod C, adapted to hold the sections when swung apart and when swung together, substantially as specified.

M. FLAMMANG.

Witnesses:
T. J. KEANE,
JAMES R. BOWEN.